United States Patent
Takatsu

(10) Patent No.: US 10,143,213 B2
(45) Date of Patent: Dec. 4, 2018

(54) PACKAGED BEVERAGE

(71) Applicant: KAO CORPORATION, Tokyo (JP)

(72) Inventor: Hideyuki Takatsu, Chiba (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/551,948

(22) PCT Filed: Sep. 28, 2015

(86) PCT No.: PCT/JP2015/077367
§ 371 (c)(1),
(2) Date: Aug. 18, 2017

(87) PCT Pub. No.: WO2016/132585
PCT Pub. Date: Aug. 25, 2016

(65) Prior Publication Data
US 2018/0070605 A1 Mar. 15, 2018

(30) Foreign Application Priority Data

Feb. 20, 2015 (JP) .................................. 2015-031994

(51) Int. Cl.
 *A23L 2/56* (2006.01)
 *A23F 3/16* (2006.01)
 *A23L 2/54* (2006.01)

(52) U.S. Cl.
 CPC ....... *A23F 3/16* (2013.01); *A23L 2/54* (2013.01); *A23V 2002/00* (2013.01)

(58) Field of Classification Search
 CPC .. C12C 3/12; C12C 3/08; C12C 5/026; C12C 9/025; C12C 3/00; C12C 5/02; A23V 2002/00; A23V 2250/21; A23L 33/105; A23L 33/10; A23L 3/3472; A23L 2/56
 USPC ............ 426/600, 429, 16, 592, 431, 11, 655
 See application file for complete search history.

(56) References Cited

U.S. PATENT DOCUMENTS

2005/0003042 A1* 1/2005 Gimbel ............... C12C 3/00
  426/16
2013/0273228 A1* 10/2013 Hosoya ............... A23F 3/163
  426/592

FOREIGN PATENT DOCUMENTS

| | | |
|---|---|---|
| CN | 1903082 A | 1/2007 |
| CN | 101161087 A | 4/2008 |
| CN | 101348755 A | 1/2009 |
| CN | 103126030 A | 6/2013 |
| CN | 103282480 A | 9/2013 |
| CN | 103907989 A | 7/2014 |
| JP | 3-168046 A | 7/1991 |
| JP | 10-4919 A | 1/1998 |
| JP | 2010-43064 A | 2/2010 |
| JP | 2013-43850 A | 3/2013 |
| JP | 2014-138583 A | 7/2014 |
| WO | 2014/098139 A1 | 6/2014 |

OTHER PUBLICATIONS

Miyaji, 1$^{st}$ edition, Shokuhin Sangyo Shimbunsha Co., Ltd., published Dec. 28, 1999, pp. 54-56 (w/English abstract).
Dun Yi Guan, "Beer Industry Brochure" China Light Industry Press, 1$^{st}$ Edition, vol. 1, Apr. 30, 1982, pp. 249-253 (with Partial English translation).

* cited by examiner

*Primary Examiner* — Hong T Yoo
(74) *Attorney, Agent, or Firm* — Oblon, McClelland, Maier & Neustadt, L.L.P.

(57) ABSTRACT

Provided is a packaged beverage, including the following components: (A) 0.025 mass % to 0.5 mass % of a non-polymer catechin; and (B) at least one selected from the group consisting of an α-acid and an iso-α-acid, as well as a β-acid, in which: a mass ratio of (B2) the β-acid to the component (B), [(B2)/(B)], is 0.01 or more; and the packaged beverage has a pH of from 2 to 5.

9 Claims, No Drawings

PACKAGED BEVERAGE

FIELD OF THE INVENTION

The present invention relates to a packaged beverage.

BACKGROUND OF THE INVENTION

A non-polymer catechin is a natural polyphenol compound present in a tea leaf or the like, and has various physiological activities. Accordingly, its application to food and drink has been attracting attention. Of such applications, a packaged beverage containing a large amount of the non-polymer catechin has been developed because the beverage can be easily ingested as a lifestyle habit and is portable.

However, the packaged beverage containing the non-polymer catechin at a high concentration has strong bitterness or astringency derived from the non-polymer catechin, and hence involves an unpleasant feeling or a feeling of disgust in some cases. For example, a method involving blending the beverage with a cyclodextrin or a peptide has been known as means for suppressing such unpleasant bitterness (Patent Documents 1 and 2).

[Patent Document 1] JP-A-3-168046
[Patent Document 2] JP-A-10-004919

SUMMARY OF THE INVENTION

The present invention provides a packaged beverage, comprising the following components:

(A) 0.025 mass % to 0.5 mass of a non-polymer catechin; and (B) at least one selected from the group consisting of an α-acid and an iso-α-acid, as well as a β-acid, wherein:

a mass ratio of (B2) the β-acid to the component (B) [(B2)/(B)], is 0.01 or more; and the packaged beverage has a pH of from 2 to 5 and an ethanol content of less than 1 mass %.

DETAILED DESCRIPTION OF THE INVENTION

The inventor of the present invention made a detailed investigation on the taste and flavor of a packaged beverage containing a non-polymer catechin, and as a result, found that in the case where the non-polymer catechin-containing packaged beverage has a low ethanol content, when the beverage is stored for a long term, its astringency is strengthened. In addition, the inventor found that the tendency becomes more remarkable as the concentration of the non-polymer catechin is increased.

The present invention relates to a non-polymer catechin-containing packaged beverage that is suppressed in strengthening of its astringency and hence has slight astringency even after stored for a long term.

The inventor of the present invention made extensive investigations, and as a result, found that when at least one selected from the group consisting of an α-acid and an iso-α-acid, and a β-acid are incorporated into a non-polymer catechin-containing beverage, the mass ratio of the β-acid to the total amount of these compounds is specified to a specific amount, and the pH of the beverage is controlled within a specific range, not only the strengthening of the astringency of the beverage at the time of its long-term storage can be suppressed, but also the astringency at the time of the long-term storage can be reduced.

According to the present invention, there can be provided a non-polymer catechin-containing packaged beverage that can not only be suppressed in strengthening of its astringency even when stored for a long term but also be reduced in astringency at the time of the long-term storage, and that is suppressed in change in color even when stored for a long term.

The packaged beverage of the present invention comprises a non-polymer catechin as a component (A). Here, the term "(A) non-polymer catechin" as used herein is a collective term for a combination of non-gallate forms, such as catechin, gallocatechin, epicatechin, and epigallocatechin, and gallate forms, such as catechin gallate, gallocatechin gallate, epicatechin gallate, and epigallocatechin gallate. In the present invention, at least one out of the eight non-polymer catechins only needs to be incorporated.

The content of the component (A) in the packaged beverage of the present invention, which is from 0.025 mass % to 0.5 mass %, is preferably 0.04 mass % or more, more preferably 0.06 mass % or more from the viewpoint of the preparation of a packaged beverage containing a high concentration of a non-polymer catechin and the viewpoint of a physiological effect, and is preferably 0.3 mass % or less, more preferably 0.2 mass % or less from the viewpoint of not only effectively suppressing the strengthening of its astringency at the time of its long-term storage but also reducing the astringency at the time of the long-term storage and the viewpoint of effective suppression of a change in color at the time of the long-term storage. The content of the component (A) in the packaged beverage of the present invention falls within the range of preferably from 0.04 mass % to 0.3 mass %, more preferably from 0.06 mass % to 0.2 mass %. The content of the component (A) is defined on the basis of the total amount of the eight non-polymer catechins as mentioned above. The content of the component (A) may be analyzed by liquid chromatography, and specifically, the content may be analyzed by a method described in Examples to be described later.

The packaged beverage of the present invention comprises (B1) at least one selected from the group consisting of an α-acid and an iso-α-acid, and (B2) a β-acid, as the component (B). Herein, the term "α-acid" is a collective term for humulone, adhumulone, cohumulone, posthumulone, and prehumulone. In addition, the term "iso-α-acid" is a collective term for isohumulone, isoadhumulone, isocohumulone, isoposthumulone, and isoprehumulone. Further, the term "β-acid" is a collective term for lupulone, adlupulone, and colupulone. In the present invention, the content of the component (B) is defined on the basis of the total amount of the five α-acids, the five iso-α-acids, and the three β-acids. In addition, the content of (B1) at least one selected from the group consisting of the α-acid and the iso-α-acid is defined on the basis of the total amount of the ten kinds, and at least one out of the ten α-acids or iso-α-acids only needs to be incorporated. The content of (B2) the β-acid is defined on the basis of the total amount of the three kinds, and at least one out of the three β-acids only needs to be incorporated.

In the present invention, the mass ratio of the component (B2) to the component (B), [(B2)/(B)], which is 0.01 or more, is preferably 0.03 or more, more preferably 0.05 or more, even more preferably 0.1 or more from not only the viewpoint of effective suppression of the strengthening of the astringency of the beverage at the time of its long-term storage but also the viewpoint of a reduction in astringency at the time of the long-term storage and the viewpoint of effective suppression of a change in color at the time of the long-term storage, and is preferably 0.99 or less, more preferably 0.985 or less, even more preferably 0.98 or less from the viewpoint of the turbidity and the balance of taste. Such mass ratio [(B2)/(B)] falls within the range of preferably from 0.01 to 0.99, more preferably from 0.03 to 0.99, more preferably from 0.05 to 0.985, even more preferably from 0.1 to 0.98.

The content of the component (B) in the packaged beverage of the present invention is preferably 0.000001 mass % or more, more preferably 0.000005 mass % or more, more preferably 0.00001 mass % or more, even more preferably 0.00005 mass % or more from the viewpoint of effective suppression of a change in color at the time of its long-term storage, and is preferably 0.002 mass % or less, more preferably 0.001 mass % or less from the viewpoint of the turbidity and the balance of taste. Such content of the component (B) falls within the range of preferably from 0.000001 mass % to 0.002 mass %, more preferably from 0.000005 mass % to 0.002 mass %, more preferably from 0.00001 mass % to 0.001 mass %, even more preferably from 0.00005 mass % to 0.001 mass %.

The content of the component (B1) in the packaged beverage of the present invention is preferably 0.0000001 mass % or more, more preferably 0.00000015 mass % or more, even more preferably 0.000001 mass % or more from the viewpoint of the turbidity and the balance of taste, and is preferably 0.0005 mass % or less, more preferably 0.0003 mass % or less, even more preferably 0.0002 mass or less from not only the viewpoint of effective suppression of the strengthening of its astringency at the time of its long-term storage but also the viewpoint of a reduction in astringency at the time of the long-term storage and the viewpoint of effective suppression of a change in color at the time of the long-term storage. Such content of the component (B1) falls within the range of preferably from 0.0000001 mass-% to 0.0005 mass %, more preferably from 0.00000015 mass % to 0.0003 mass %, even more preferably from 0.000001 mass % to 0.0002 mass %. The content of the component (B1) may be analyzed by liquid chromatography, and specifically, the content may be analyzed by a method described in Examples to be described later. At the time of the measurement of the content, such a treatment as described below may be appropriately performed as required: the sample is freeze-dried in order that it may be adapted to the detection region of an apparatus for liquid chromatography; or impurities in the sample are removed in order that it may be adapted to the resolution of the apparatus.

The content of the component (B2) in the packaged beverage of the present invention is preferably 0.000001 mass % or more, more preferably 0.000002 mass % or more, more preferably 0.000003 mass % or more, even more preferably 0.00001 mass % or more from not only the viewpoint of effective suppression of the strengthening of its astringency at the time of its long-term storage but also the viewpoint of a reduction in astringency at the time of the long-term storage and the viewpoint of effective suppression of a change in color at the time of the long-term storage, and is preferably 0.002 mass % or less, more preferably 0.0015 mass or less, even more preferably 0.001 mass % or less from the viewpoint of the balance of its taste. Such content of the component (B2) falls within the range of preferably from 0.000001 mass % to 0.002 mass %, more preferably from 0.000002 mass % to 0.0015 mass %, more preferably from 0.000003 mass % to 0.001 mass %, even more preferably from 0.00001 mass % to 0.001 mass %. The content of the component (B2) may be analyzed by liquid chromatography, and specifically, the content may be analyzed by a method described in Examples to be described later. At the time of the measurement of the content, such a treatment as described below may be appropriately performed as required: the sample is freeze-dried in order that it may be adapted to the detection region of an apparatus for liquid chromatography; or impurities in the sample are removed in order that it may be adapted to the resolution of the apparatus.

The mass ratio of the component (B) to the component (A), [(B)/(A)], in the packaged beverage of the present invention is preferably 0.00001 or more, more preferably 0.00002 or more, even more preferably 0.00005 or more from not only the viewpoint of effective suppression of the strengthening of its astringency at the time of its long-term storage but also the viewpoint of a reduction in astringency at the time of the long-term storage and the viewpoint of effective suppression of a change in color at the time of the long-term storage, and is preferably 1 or less, more preferably 0.1 or less, even more preferably 0.01 or less from the viewpoint of the balance of its taste. Such mass ratio [(B)/(A)] falls within the range of preferably from 0.00001 to 1, more preferably from 0.00002 to 0.1, even more preferably from 0.00005 to 0.01.

In addition, the mass ratio of the component (B2) to the component (A) in the packaged beverage of the present invention, [(B2)/(A)], is preferably 0.000001 or more, more preferably 0.000005 or more, more preferably 0.00001 or more, even more preferably 0.0001 or more from not only the viewpoint of effective suppression of the strengthening of its astringency at the time of its long-term storage but also the viewpoint of a reduction in astringency at the time of the long-term storage and the viewpoint of effective suppression of a change in color at the time of the long-term storage, and is preferably 1 or less, more preferably 0.1 or less, even more preferably 0.01 or less from the viewpoint of the balance of its taste. Such mass ratio [(B2)/(A)] falls within the range of preferably from 0.000001 to 1, more preferably from 0.000005 to 0.1, more preferably from 0.00001 to 0.01, even more preferably from 0.0001 to 0.01.

The packaged beverage of the present invention may comprise an acidulant as a component (C) in order that the effects of the present invention may be effectively exhibited.

The component (C) may be an organic acid or an inorganic acid, or may be in the form of a salt thereof. Specific examples thereof may include one or two or more selected from the group consisting of citric acid, gluconic acid, ascorbic acid, succinic acid, tartaric acid, lactic acid, fumaric acid, malic acid, adipic acid, phosphoric acid, phytic acid, acetic acid, and salts thereof. Of those, one or two or more selected from the group consisting of citric acid, gluconic acid, phosphoric acid, and salts thereof are preferred, and one or two or more selected from the group consisting of gluconic acid and salts thereof are more preferred. Examples of the salts may include alkali metal salts each containing potassium, sodium or the like.

The content of the component (C) in the packaged beverage of the present invention is preferably 0.0005 mass % or more, more preferably 0.001 mass % or more, more preferably 0.005 mass % or more, even more preferably 0.01 mass or more from the viewpoint of imparting moderate acidity to the beverage, and is preferably 1 mass % or less, more preferably 0.5 mass % or less, more preferably 0.15 mass % or less, even more preferably 0.09 mass % or less from not only the viewpoint of effective suppression of the strengthening of its astringency at the time of its long-term storage but also the viewpoint that the astringency at the time of the long-term storage can be reduced. Such content of the component (C) in the packaged beverage of the present invention falls within the range of preferably from 0.0005 mass % to 1 mass %, more preferably from 0.001 mass % to 0.5 mass %, more preferably from 0.005 mass % to 0.15 mass %, even more preferably from 0.01 mass % to 0.09 mass %. When an acid is used in the form of a salt as (C) the acidulant, the content of the component (C) is considered as an amount in terms of the acid (acid conversion amount), and when two or more of materials are incorporated as the component (C), the content of the component (C) is a total amount thereof.

The packaged beverage of the present invention may comprise a carbon dioxide gas as a component (D).

From not only the viewpoint of effective suppression of the strengthening of the astringency of the packaged beverage of the present invention at the time of its long-term storage but also the viewpoint of a reduction in astringency at the time of the long-term storage and the viewpoint of effective suppression of a change in color at the time of the long-term storage, the carbon dioxide gas to be injected into the packaged beverage of the present invention has a gas volume (v/v) in a standard condition, i.e., at 0° C. and 1 atm of preferably 1 (v/v) or more, more preferably 1.5 (v/v) or more, more preferably 2 (v/v) or more, even more preferably 2.3 (v/v) or more, and is preferably 3 (v/v) or less, more preferably 2.7 (v/v) or less, more preferably 2.6 (v/v) or less, even more preferably 2.5 (v/v) or less. The content of the component (D) in the packaged beverage of the present invention in terms of a gas volume at 0° C. and 1 atm falls within the range of preferably from 1 (v/v) to 3 (v/v), more preferably from 1.5 (v/v) to 2.7 (v/v), more preferably from 2 (v/v) to 2.6 (v/v), even more preferably from 2.3 (v/v) to 2.5 (v/v). Herein, the term "gas volume (GV)" refers to a ratio between the volume of the carbon dioxide gas dissolved in the packaged beverage at 1 atm and 0° C., and the volume of the beverage. The content of the component (D) may be measured by an analysis method suitable for the state of a measured sample out of typically known measurement methods for a carbon dioxide gas content. Specifically, the measurement is performed in conformity with a method described in Examples to be described later.

The packaged beverage of the present invention may comprise one or two or more of additives, such as a sweetener, flavor, a vitamin, a mineral, an antioxidant, various esters, an emulsifier, a preservative, a seasoning, a fruit juice extract, a vegetable extract, a nectar extract, and a quality stabilizer, as desired. The content of any such additive may be appropriately set to the extent that the object of the present invention is not impaired.

The pH (20° C.) of the packaged beverage of the present invention is from 2 to 5, and from the viewpoint of effective suppression of the strengthening of its astringency at the time of its long-term storage, the pH is preferably 2.3 or more, more preferably 2.5 or more, even more preferably 3 or more, and is preferably 4.5 or less, more preferably 4 or less. Such pH falls within the range of preferably from 2.3 to 5, more preferably from 2.5 to 4.5, even more preferably from 3 to 4. A method of measuring the pH is in conformity with a method described in Examples to be described later.

The packaged beverage of the present invention is preferably a tea beverage because its astringency can be clearly grasped. Examples of the tea beverage include a green tea beverage, an oolong tea beverage, and a black tea beverage. Of those, the green tea beverage is preferred. In addition, the packaged beverage of the present invention may be, for example, an isotonic beverage, enhanced water, bottled water, near water, a coffee beverage, an energy drink, or a drink for beauty, and the beverage may comprise a non-polymer catechin. It is more preferably an acidic beverage, such as a fruit juice beverage, a vegetable beverage, a carbonated beverage, a lactic acid bacteria beverage, or a sports beverage, in particular, the carbonated beverage, because the effects of the present invention are significantly exhibited.

A content of ethanol in the packaged beverage of the present invention is less than 1 mass %. In particular, the content of ethanol in the packaged beverage of the present invention is preferably less than 0.7 mass %, more preferably less than 0.6 mass %, more preferably less than 0.3 mass %, more preferably 0 mass %, and is even more preferably 0.00 mass % from the viewpoint that the beverage is provided as anon-alcohol beverage. As described in the foregoing, the inventor of the present invention firstly found that when the content of ethanol is less than 1 mass %, a problem in that the astringency of the beverage at the time of its storage is strengthened occurs.

The phrase "ethanol content is 0.00 mass %" used herein is a concept encompassing the case where the ethanol content is below a detection limit in less than two decimal places in the section "Analysis of Ethanol" described in Examples to be described later. The analysis of ethanol is in conformity with a method described in Examples to be described later.

In addition, the packaged beverage of the present invention is suppressed in change in color at the time of long-term storage. For example, a value (Δb) obtained by subtracting, from the b value of the packaged beverage after storage at 55° C. for 14 days, the b value of the packaged beverage before the storage (immediately after production/after storage at 5° C. for 14 days) may be preferably set within the range of from −27 or more to +27 or less, may be more preferably set within the range of from −26 or more to +26 or less, and may be even more preferably set within the range of from 0 or more to 25 or less. The term "b value" used herein refers to a color or chroma represented by a yellow-to-blue axis when a color is represented in an Lab color system. A larger b value means a higher yellow hue and a smaller b value means a higher blue hue. Although the Lab color system has an L value and an a value, in the present invention, the b value that most easily becomes apparent when the packaged beverage undergoes a change in color is specified. The b value may be measured in conformity with the section "Measurement of Change in Color" described in Examples to be described later. The b value of the packaged beverage after the storage at 5° C. for 14 days is substantially equal to the b value of the packaged beverage before the storage (e.g., immediately after the production) because the beverage has been stored at low temperature. Accordingly, the suppression of a change in color of the packaged beverage at the time of the long-term storage is evaluated on the assumption that the b value of the packaged beverage after the storage at 5° C. for 14 days is the b value of the packaged beverage before the storage.

The packaged beverage of the present invention, which may be produced by an appropriate method, may be produced by: blending a raw material containing the non-polymer catechin, such as a tea extract, with raw materials containing at least one selected from the group consisting of the α-acid and the iso-α-acid, as well as the β-acid; and controlling the mass ratio [(B2)/(B)] and the pH within the above-mentioned ranges.

An example of the tea extract is an extract solution obtained from leaves of tea selected from the group consisting of unfermented tea, semi-fermented tea, and fermented tea with hot water or a water-soluble organic solvent through kneader extraction or column extraction. Of those, an extract solution of unfermented tea is preferred, and an extract solution of green tea is more preferred, from the viewpoint of the content of the non-polymer catechin. In addition, a concentrated tea obtained by removing part of a solvent from a tea extract solution to increase the concentration of the non-polymer catechin may be used as the tea extract. The concentrated tea may have various forms, such as a solid, an aqueous solution, and a slurry. A commercially available product may be used as the concentrated tea, and examples thereof may include green tea extracts, such as "POLYPHENON" and "Tea Extract POL-JM" manufactured by Mitsui Norin Co., Ltd., "TEAFURAN" manufactured by ITO EN, LTD., and "SUNPHENON" manufactured by Taiyo Kagaku Co., Ltd.

In addition, as the tea extract, a purified tea extract obtained by purifying a tea extract solution or a concentrate thereof so as to contain a non-polymer catechin at a higher purity may be used. As a purification method, there may be given, for example, one or more of the following methods (i) to (iii).

(i) A method of involving suspending a tea extract in water, a water-soluble organic solvent (for example, ethanol), or an organic solvent aqueous solution (for example, an ethanol aqueous solution; the same applies hereinafter), removing the resultant precipitate, and distilling off the solvent (for example, JP-A-2004-147508 and JP-A-2004-149416).

(ii) A method involving bringing a tea extract into contact with at least one adsorbent selected from the group consisting of activated carbon, acid clay, and activated clay (for example, JP-A-2007-282568).

(iii) A method involving adsorbing a tea extract to a synthetic adsorbent, bringing an organic solvent aqueous solution or a basic aqueous solution (for example, a sodium hydroxide aqueous solution) into contact with the synthetic adsorbent to desorb a non-polymer catechin, and if necessary, bringing the resultant desorbed liquid into contact with activated carbon (for example, JP-A-2006-160656 and JP-A-2008-079609).

In each of the methods (i) to (iii), the ratio of a gallate form in the non-polymer catechin may be adjusted to, for example, from 20 mass % to 60 mass %, preferably from 30 mass % to 55 mass % by bringing the tea extract into contact with an enzyme having tannase activity. The term "ratio of a gallate form in the non-polymer catechin" used herein refers to the mass ratio of the four gallate forms with respect to the eight non-polymer catechins. For example, a method disclosed in JP-A-2004-321105 may be incorporated herein, for contact treatment with the enzyme having tannase activity.

The packaged beverage of the present invention may be provided by being filled into a general packaging container, such as a molded container mainly formed of polyethylene terephthalate (so-called PET bottle), a metal can, a bottle, or carton.

The packaged beverage of the present invention is preferably subjected to heat sterilization from the viewpoint that the effects of the present invention are sufficiently imparted thereto. A method for the heat sterilization is not particularly limited as long as it complies with a condition specified by an applicable regulation (Food Sanitation Act in Japan). Examples of the method may include a retort sterilization method, a high-temperature short-time sterilization method (HTST method), an ultrahigh-temperature sterilization method (UHT method), and a post-filling sterilization method (pasteurization). In addition, the method for the heat sterilization may be appropriately selected depending on the kind of the container for the packaged beverage. For example, when a container filled with a beverage can be subjected to heat sterilization as it is, like a metal can or a bottle, retort sterilization or a post-filling sterilization method (pasteurization) may be adopted. Meanwhile, when a container, such as a PET bottle, which cannot be subjected to retort sterilization, is used, there may be adopted: aseptic filling, which involves subjecting a beverage to heat sterilization in advance under the same sterilization conditions as those described above and filling the beverage into a container subjected to sterilization treatment in an aseptic environment; or hot-pack filling. Under such heat sterilization conditions, the effects of the present invention are sufficiently imparted. More suitable heat sterilization conditions are, for example, as follows from the viewpoint of the suppression of a change in color of the beverage at the time of its storage: the heat sterilization is performed more preferably at from 60° C. to 140° C. for from 0.1 minute to 30 minutes, more preferably at from 60° C. to 140° C. for from 0.3 minute to 30 minutes, even more preferably at from 60° C. to 120° C. for from 1 minute to 25 minutes.

With regard to the above-mentioned embodiment, the present invention further discloses the following packaged beverage or method.

<1>

A packaged beverage, comprising the following components:

(A) 0.025 masse to 0.5 mass % of a non-polymer catechin; and (B) at least one selected from the group consisting of an α-acid and an iso-α-acid, as well as a β-acid, wherein:

a mass ratio of (B2) the β-acid to the component (B), [(B2)/(B)], is 0.01 or more; and the packaged beverage has a pH of from 2 to 5 and an ethanol content of less than 1 mass %.

<2>

A method of suppressing a strengthening of the astringency, or a change in color, of a packaged beverage containing a non-polymer catechin at the time of long-term storage, the method comprising:

blending the following components:

(A) 0.025 mass % to 0.5 mass % of a non-polymer catechin; and (B) at least one selected from the group consisting of an α-acid and an iso-α-acid, as well as a β-acid; and adjusting the mass ratio of (B2) the β-acid to the component (B), [(B2)/(B)], to 0.01 or more, and the pH of the beverage to from 2 to 5.

<3>

The packaged beverage according to the above-mentioned item <1> or the suppression method according to the above-mentioned item <2> ("the packaged beverage or the suppression method" is hereinafter referred to as "the packaged beverage or the like"), wherein (A) the non-polymer catechin is preferably one or two or more selected from the group consisting of catechin, gallocatechin, epicatechin, epigallocatechin, catechin gallate, gallocatechin gallate, epicatechin gallate, and epigallocatechin gallate, more preferably all of the eight kinds.

<4>

The packaged beverage or the like according to any one of the above-mentioned items <1> to <3>, wherein the content of the component (A) is preferably 0.04 mass % or more, more preferably 0.06 mass % or more, and is preferably 0.3 mass % or less, more preferably 0.2 mass % or less.

<5>

The packaged beverage or the like according to any one of the above-mentioned items <1> to <4>, wherein the content of the component (A) is preferably from 0.04 mass % to 0.3 mass %, more preferably from 0.06 mass % to 0.2 mass %.

<6>

The packaged beverage or the like according to any one of the above-mentioned items <1> to <5>, wherein (B1) the α-acid and the iso-α-acid are preferably one or two or more selected from the group consisting of humulone, adhumulone, cohumulone, posthumulone, prehumulone, isohumulone, isoadhumulone, isocohumulone, isoposthumulone, and isoprehumulone, and (B2) the β-acid is preferably one or two or more selected from the group consisting of lupron, adlupron, and colupron.

<7>

The packaged beverage or the like according to any one of the above-mentioned items <1> to <6>, wherein the mass ratio of the component (B2) to the component (B), [(B2)/(B)], is preferably 0.03 or more, more preferably 0.05 or more, even more preferably 0.1 or more, and is preferably 0.99 or less, more preferably 0.985 or less, even more preferably 0.98 or less.

<8>

The packaged beverage or the like according to any one of the above-mentioned items <1> to <7>, wherein the mass ratio of the component (B2) to the component (B) [(B2)/(B)], is preferably from 0.01 to 0.99, more preferably from 0.03 to 0.99, more preferably from 0.05 to 0.985, even more preferably from 0.1 to 0.98.

<9>

The packaged beverage or the like according to any one of the above-mentioned items <1> to <8>, wherein the content of the component (B) is preferably 0.000001 mass % or more, more preferably 0.000005 mass % or more, more preferably 0.00001 mass % or more, even more preferably 0.00005 mass % or more, and is preferably 0.002 mass % or less, more preferably 0.001 mass % or less.

<10>

The packaged beverage or the like according to any one of the above-mentioned items <1> to <9>, wherein the content of the component (B) is preferably from 0.000001 mass % to 0.002 mass %, more preferably from 0.000005 mass % to 0.002 mass %, more preferably from 0.00001 mass % to 0.001 mass %, even more preferably from 0.00005 mass % to 0.001 mass %.

<11>

The packaged beverage or the like according to any one of the above-mentioned items <1> to <10>, wherein the content of (B1) the α-acid and the iso-α-acid is preferably 0.0000001 mass % or more, more preferably 0.00000015 mass % or more, even more preferably 0.000001 mass % or more, and is preferably 0.0005 mass % or less, more preferably 0.0003 mass % or less, even more preferably 0.0002 mass % or less.

<12>

The packaged beverage or the like according to any one of the above-mentioned items <1> to <11>, wherein the content of (B1) the α-acid and the iso-α-acid is preferably from 0.0000001 mass % to 0.0005 mass %, more preferably from 0.00000015 mass % to 0.0003 mass %, even more preferably from 0.000001 mass to 0.0002 mass %.

<13>

The packaged beverage or the like according to any one of the above-mentioned items <1> to <12>, wherein the content of the component (B2) is preferably 0.000001 mass more, more preferably 0.000002 mass % or more, more preferably 0.000003 mass % or more, even more preferably 0.00001 mass % or more, and is preferably 0.002 mass % or less, more preferably 0.0015 mass % or less, even more preferably 0.001 mass % or less.

<14>

The packaged beverage or the like according to any one of the above-mentioned items <1> to <13>, wherein the content of the component (B2) is preferably from 0.000001 mass % to 0.002 mass %, more preferably from 0.000002 mass % to 0.0015 mass %, more preferably from 0.000003 mass % to 0.001 mass %, even more preferably from 0.00001 ma to 0.001 mass %.

<15>

The packaged beverage or the like according to any one of the above-mentioned items <1> to <14>, wherein the mass ratio of the component (B) to the component (A), [(B)/(A)], is preferably 0.00001 or more, more preferably 0.00002 or more, even more preferably 0.00005 or more, and is preferably 1 or less, more preferably 0.1 or less, even more preferably 0.01 or less.

<16>

The packaged beverage or the like according to any one of the above-mentioned items <1> to <15>, wherein the mass ratio of the component (B) to the component (A), [(B)/(A)], is preferably from 0.00001 to 1, more preferably from 0.00002 to 0.1, even more preferably from 0.00005 to 0.01.

<17>

The packaged beverage or the like according to any one of the above-mentioned items <1> to <16>, wherein the mass ratio of the component (B2) to the component (A), [(B2)/(A)], is preferably 0.000001 or more, more preferably 0.000005 or more, more preferably 0.00001 or more, even more preferably 0.0001 or more, and is preferably 1 or less, more preferably 0.1 or less, even more preferably 0.01 or less.

<18>

The packaged beverage or the like according to any one of the above-mentioned items <1> to <17>, wherein the mass ratio of the component (B2) to the component (A), [(B2)/(A)], is preferably from 0.000001 to 1, more preferably from 0.000005 to 0.1, more preferably from 0.00001 to 0.01, even more preferably from 0.0001 to 0.01.

<19>

The packaged beverage or the like according to any one of the above-mentioned items <1> to <18>, preferably further comprising an acidulant as a component (C).

<20>

The packaged beverage or the like according to the above-mentioned item <19>, wherein the component (C) is preferably one or two or more selected from the group consisting of an organic acid, an inorganic acid, and salts thereof, more preferably one or two or more selected from the group consisting of citric acid, gluconic acid, ascorbic acid, succinic acid, tartaric acid, lactic acid, fumaric acid, malic acid, adipic acid, phosphoric acid, phytic acid, acetic acid, and salts thereof, more preferably one or two or more selected from the group consisting of citric acid, gluconic acid, phosphoric acid, and salts thereof, even more preferably one or two or more selected from the group consisting of gluconic acid and salts thereof.

<21>

The packaged beverage or the like according to the above-mentioned item <20>, wherein the salts are preferably alkali metal salts, more preferably one or two kinds selected from the group consisting of a potassium salt and a sodium salt.

<22>

The packaged beverage or the like according to any one of the above-mentioned items <19> to <21>, wherein the content of the component (C) is preferably 0.0005 mass % or more, more preferably 0.001 mass % or more, more preferably 0.005 mass or more, even more preferably 0.01 mass % or more, and is preferably 1 mass % or less, more preferably 0.5 mass % or less, more preferably 0.15 mass % or less, even more preferably 0.09 mass % or less.

<23>

The packaged beverage or the like according to anyone of the above-mentioned items <19> to <22>, wherein the content of the component (C) is preferably from 0.0005 mass % to 1 mass %, more preferably from 0.001 mass % to 0.5 mass %, more preferably from 0.005 mass % to 0.15 mass %, even more preferably from 0.01 mass % to 0.09 mass %.

<24>

The packaged beverage or the like according to any one of the above-mentioned items <1> to <23>, preferably further comprising a carbon dioxide gas as a component (D).

<25>

The packaged beverage or the like according to the above-mentioned item <24>, wherein the content of the component (D) in terms of a gas volume (v/v) at 0° C. and 1 atm is preferably 1 (v/v) or more, more preferably 1.5 (v/v) or more, more preferably 2 (v/v) or more, even more preferably 2.3 (v/v) or more, and is preferably 3 (v/v) or less, more preferably 2.7 (v/v) or less, more preferably 2.6 (v/v) or less, even more preferably 2.5 (v/v) or less.

<26>

The packaged beverage or the like according to the above-mentioned item <24> or <25>, wherein the content of the component (D) in terms of a gas volume (v/v) at 0° C. and 1 atm is preferably from 1 (v/v) to 3 (v/v), more preferably from 1.5 (v/v) to 2.7 (v/v), more preferably from 2 (v/v) to 2.6 (v/v), even more preferably from 2.3 (v/v) to 2.5 (v/v).

<27>

The packaged beverage or the like according to any one of the above-mentioned items <1> to <26>, preferably further comprising one or two or more of additives selected from the group consisting of a sweetener, a flavor, a vitamin, a mineral, an antioxidant, various esters, an emulsifier, a preservative, a seasoning, a fruit juice extract, a vegetable extract, a nectar extract, and a quality stabilizer.

<28>

The packaged beverage or the like according to any one of the above-mentioned items <1> to <27>, wherein the pH (20° C.) of the packaged beverage is preferably 2.3 or more, more preferably 2.5 or more, even more preferably 3 or more, and is preferably 4.5 or less, more preferably 4 or less.

<29>

The packaged beverage or the like according to any one of the above-mentioned items <1> to <28>, wherein the pH (20° C.) of the packaged beverage is preferably from 2.3 to 5, more preferably from 2.5 to 4.5, even more preferably from 3 to 4.

<30>

The packaged beverage or the like according to any one of the above-mentioned items <1> to <29>, wherein the packaged beverage is preferably a tea beverage, more preferably a green tea beverage, an oolong tea beverage, or a black tea beverage, even more preferably the green tea beverage.

<31>

The packaged beverage or the like according to any one of the above-mentioned items <1> to <29>, wherein the packaged beverage is preferably an isotonic beverage, enhanced water, bottled water, near water, a coffee beverage, an energy drink, or a drink for beauty, more preferably an acidic beverage, more preferably a fruit juice beverage, a vegetable beverage, a carbonated beverage, a lactic acid bacteria beverage, or a sports beverage, even more preferably the carbonated beverage.

<32>

The packaged beverage or the like according to any one of the above-mentioned items <1> to <31>, wherein the content of ethanol is preferably less than 0.7 mass %, more preferably less than 0.6 mass %, more preferably less than 0.3 mass %, more preferably 0 mass %, even more preferably 0.00 mass %.

<33>

The packaged beverage or the like according to any one of the above-mentioned items <1> to <32>, wherein the ratio of a gallate form in (A) the non-polymer catechin is preferably from 20 mass % to 60 mass %, more preferably from 30 mass % to 55 mass %.

<34>

The packaged beverage or the like according to any one of the above-mentioned items <1> to <33>, wherein a container for the packaged beverage is preferably a molded container using polyethylene terephthalate as a main component (so-called PET bottle), a metal can, a bottle, or carton.

<35>

The packaged beverage or the like according to any one of the above-mentioned items <1> to <34>, wherein the packaged beverage is preferably subjected to heat sterilization.

<36>

The packaged beverage or the like according to the above-mentioned item <35>, wherein the heat sterilization preferably one which complies with a condition specified by an applicable regulation (Food Sanitation Act in Japan), more preferably retort sterilization, high-temperature short-time sterilization (HTST method), ultrahigh-temperature sterilization (UHT method), or post-filling sterilization (pasteurization).

<37>

The packaged beverage or the like according to the above-mentioned item <35> or <36>, wherein the heat sterilization is performed under the following conditions: preferably at from 60° C. to 140° C. for from 0.1 minute to 30 minutes, more preferably at from 60° C. to 140° C. for from 0.3 minute to 30 minutes, even more preferably at from 60° C. to 120° C. for from 1 minute to 25 minutes.

<38>

The packaged beverage or the like according to any one of the above-mentioned items <1> to <37>, wherein a change in color (Δb) of the packaged beverage determined from the following equation by using the b value in an Lab color system of the packaged beverage after storage at 5° C. for 14 days and the b value in the Lab color system of the packaged beverage after storage at 55° C. for 14 days is preferably 27.5 or less, more preferably 26.5 or less, more preferably 25.5 or less, even more preferably 24.5 or less.

$\Delta b$=($b$ value of packaged beverage after storage at 55° C. for 14 days)−($b$ value of packaged beverage after storage at 5° C. for 14 days)

<39>

The packaged beverage or the like according to any one of the above-mentioned items <1> to <38>, wherein a value ($\Delta b$) obtained by subtracting, from the b value of the packaged beverage after storage at 55° C. for 14 days, the b value of the packaged beverage before the storage (immediately after production/after storage at 5° C. for 14 days) preferably falls within the range of from −27 or more to +27 or less, more preferably falls within the range of from −26 or more to +26 or less, and even more preferably falls within the range of from 0 or more to 25 or less.

EXAMPLES

1. Analysis of Non-Polymer Catechin

A sample solution was filtered through a filter (0.45 μm), and was analyzed by a gradient method through the use of a high-performance liquid chromatograph (model SCL-10AVP, manufactured by Shimadzu Corporation) mounted with an octadecyl group-introduced packed column for a liquid chromatograph L-Column TM ODS (4.6 mmφ×250 mm: manufactured by Chemicals Evaluation and Research Institute, Japan) at a column temperature of 40° C. A product manufactured by Kurita Water Industries Ltd. was used as the standard product of a non-polymer catechin, and the content of the catechin was determined by a calibration curve method. The determination was performed by using a distilled water solution containing 0.1 mol/L of acetic acid as the solution A of a mobile phase and an acetonitrile solution containing 0.1 mol/L of acetic acid as the solution B thereof under the conditions of a sample injection volume of 20 μL and a UV detector wavelength of 280 nm. Gradient conditions are as described below.

| Time (min) | Concentration (vol %) of solution A | Concentration (vol %) of solution B |
|---|---|---|
| 0 | 97% | 3% |
| 5 | 97% | 3% |
| 37 | 80% | 20% |
| 43 | 80% | 20% |
| 43.5 | 0% | 100% |
| 48.5 | 0% | 100% |
| 49 | 97% | 3% |
| 60 | 97% | 3% |

2. Analyses of α-Acid, Iso-α-acid, and β-Acid

Analyses were performed in accordance with BCOJ Beer Analysis Method 6.2.2 α-Acid and β-Acid-HPLC Method-.
Analysis conditions are as described below.
Mobile phase for analysis;
Solution C: methanol/water/85 mass % phosphoric acid/10 mass % tetraethylammonium hydroxide=755 mL/2,255 mL/17 g/29.5 g (pH: 3 to 3.1)
Solution D: methanol
Solution E: methanol/water/10 mass % tetraethylammonium hydroxide/42.5 mass % phosphoric acid=465 mL/135 mL/17.7 g/q.s. (pH: 4.85)
Detection:

| 0 min to 13 min | 254 nm (iso-α-acid) |
|---|---|
| 13.1 min to 22 min | 326 nm (α-acid) |
| 22.1 min to 30 min | 346 nm (β-acid) |

Sample amount: 10.0 μL
Flow rate: 1.5 mL/min
Column temperature: 50° C.
Time program of mobile phase:

| 0 min to 8 min | Solution C |
|---|---|
| 8.01 min | Solution E |
| 8.02 min to 23 min | Gradient 0 vol % to 50 vol % solution D and 100 vol % to 50 vol % solution E |
| 23.01 min to 28 min | 50 vol % solution D and 50 vol % solution E |
| 28.01 min | Solution C |

3. pH Measurement

The pH of a sample was measured with a pH meter (HORIBA Compact pH Meter, manufactured by HORIBA, Ltd.) while its temperature was adjusted to 20° C. When the sample was a carbonated beverage, about 100 mL of the sample was weighed in a 300-milliliter beaker, a stirrer piece was loaded into the beaker, and a carbon dioxide gas was removed by stirring the sample with a stirrer for 20 minutes. After that, the measurement was performed while the temperature was adjusted to 20° C.

4. Analysis of Carbon Dioxide Gas

This analysis was conducted by a method disclosed in the section "3-1-2 Inspection of Pressure in Gas" in Volume VI of "Latest Soft Drinks (Latest Soft Drinks Editorial Committee, Korin Co., Ltd., published on Sep. 30, 2003)". The method is specifically as described below.
(1) Before measurement, an unopened carbonated beverage was warmed to about 20° C. (18° C. to 22° C.) in a thermostat so that a temperature of liquid was uniformized.
(2) The beverage obtained in the (1) was loaded into a measuring machine (Kyoto Electronics Manufacturing Co., Ltd., Gas Volume Analyzer GVA-500A), and a snifting operation (involving opening a snifting valve to return a gauge to atmospheric pressure) was performed. Air in a head space was released by performing the snifting operation.
(3) Next, the sample was vigorously shaken, and when a gauge pressure showed a constant value, the value was read and the temperature of the sample was measured, followed by the determination of a gas volume from a chart (gas volume chart for snifting).

5. Analysis of Ethanol

The analysis of ethanol was performed in accordance with the following gas chromatographic method.
GC-14B (manufactured by Shimadzu Corporation) was used as an analysis apparatus.
The apparatus configuration of the analysis apparatus was as described below.
Detector: FID
Column: Gaskuropack 55, 80 mesh to 100 mesh, φ3.2 mm×3.1 mm
Analysis conditions were as described below.
Temperature: sample injection port and detector: 250° C., column: 130° C.
Gas pressure: helium (carrier gas): 140 kPa, hydrogen: 60 kPa, air: 50 kPa
Injection volume: 2 μL
A sample for analysis was prepared in accordance with the following procedure.
5 g of a sample was weighed and a constant volume of 25 mL is obtained by adding water to the sample. The solution was subjected to disc filtration to prepare a sample solution. The prepared sample solution was subjected to gas chromatographic analysis.

6. Measurement of Change in Color

Each of samples, i.e., a "packaged beverage after storage at 5° C. for 14 days" and the "packaged beverage after storage at 55° C. for 14 days" was loaded into a square cell having an optical path length of 10 mm, and its b value in an Lab color system was determined by subjecting the sample to transmission measurement through the use of a colorimetric color-difference meter (model Color Meter ZE-2000, manufactured by Nippon Denshoku Industries Co., Ltd.). A change in color (Δb) of the packaged beverage was determined from the following equation by using the "b value of the packaged beverage after the storage at 5° C. for 14 days" and the "b value of the packaged beverage after the storage at 55° C. for 14 days."

Δb=(b value of packaged beverage after storage at 55° C. for 14 days)−(b value of packaged beverage after storage at 5° C. for 14 days)

The color of the packaged beverage after the storage at 5° C. for 14 days is substantially identical to that of the packaged beverage before the storage because the beverage has been stored at low temperature. Accordingly, a change in color of the packaged beverage at the time of its long-term storage is evaluated on the assumption that the color of the packaged beverage after the storage at 5° C. for 14 days is the color of the packaged beverage before the storage.

7. Sensory Evaluation

Three expert panelists evaluated each packaged beverage for its "astringency after storage at 5° C. for 14 days" and "astringency after storage at 55° C. for 14 days" on the basis of the following criteria, and then the score of each packaged beverage was determined by consultation. Then, a difference between the scores of the astringency of the packaged beverage after the storage at 55° C. for 14 days and the astringency of the packaged beverage after the storage at 5° C. for 14 days was calculated. The astringency of the packaged beverage after the storage at 5° C. for 14 days is substantially identical to that of the packaged beverage before the storage because the beverage has been stored at low temperature. Accordingly, the increased amount of astringency of the packaged beverage at the time of its long-term storage is evaluated on the assumption that the astringency of the packaged beverage after the storage at 5° C. for 14 days is the astringency of the packaged beverage before the storage.

Evaluation Criteria of Astringency

The "astringency of the packaged beverage after the storage at 5° C. for 14 days" was compared with the "astringency of the packaged beverage after the storage at 55° C. for 14 days". The evaluation was performed in accordance with the following five-point scale. Specific evaluation criteria are as described below.

5: The astringency after the storage is reduced as compared to the packaged beverage before the storage.

4: The astringency after the storage is reduced to some extent as compared to the packaged beverage before the storage.

3: The astringency after the storage is identical to that of the packaged beverage before the storage.

2: The astringency after the storage slightly stronger than that of the packaged beverage before the storage, but is considered within an allowable range.

1: The astringency after the storage is obviously stronger than that of the packaged beverage before the storage.

Production Example 1

Production of Purified Green Tea Extract 200 g of a concentrated green tea extract solution (POLYPHENON HG, manufactured by Mitsui Norin Co., Ltd.) was dispersed in 800 g of a 95 mass ethanol aqueous solution at 25° C. under the stirring condition of 250 r/min, and 100 g of acid clay (MIZUKA ACE #600, manufactured by Mizusawa Industrial Chemicals, Ltd.) was loaded into the mixture. After that, stirring was continued for about 10 minutes. Next, the resultant was filtered through #2 filter paper. After that, 16 g of activated carbon was added to the filtrate and the mixture was filtered through #2 filter paper again. Next, the filtrate was re-filtered through a 0.2-micrometer membrane filter. Next, ethanol was distilled off from the filtrate at 40° C. under reduced pressure, and a concentration of non-polymer catechin was adjusted with ion-exchanged water. Thus, a purified green tea extract was obtained. The concentration of non-polymer catechin in the purified green tea extract was 14.8 mass %, and a concentration of polyphenol therein measured by an iron tartrate method was 15.5 mass %.

Examples 1 to 3 and 5 to 13, and Comparative Examples 1 and 2

Respective components shown in Table 1 were blended to produce beverages, and the beverages were each filled into a PET bottle, followed by heat sterilization treatment at 65° C. for 20 minutes. Thus, packaged beverages were obtained. Each of the resultant packaged beverages was subjected to the analyses and the sensory evaluation. The results are also shown in Table 1. In addition, a change in color of each of the packaged beverages of Example 10 and Comparative Examples 1 and 2 was measured. The results are shown in Table 2. The resultant packaged beverages each had an ethanol concentration of 0.00 mass %.

Example 4

Respective components shown in Table 1 except carbonated water were mixed and dissolved, and the pH of the solution was adjusted to a predetermined value with an acidulant. After that, a total amount was set to 100 parts by mass by using carbonated water (carbon dioxide gas volume ratio: 3.1) cooled to 4° C. and ion-exchanged water (the carbon dioxide gas volume ratio was appropriately adjusted to 2.5 with the carbonated water and the ion-exchanged water), and the mixture was filled into a PET bottle (postmix system). Then, the resultant was further subjected to heat sterilization at 65° C. for 20 minutes. The resultant packaged beverage was subjected to the analyses, and the sensory evaluation and the measurement of a change in color. The results of the analyses and the sensory evaluation are shown in Table 1, and the result of the measurement of a change in color is shown in Table 2. The resultant packaged beverage had an ethanol concentration of 0.00 mass %.

TABLE 1

|  |  | Example 1 | Example 2 | Example 3 | Example 4 | Example 5 |
|---|---|---|---|---|---|---|
| Formulation | Purified green tea extract[1] | 1.2 | 1.2 | 1,2 | 1.2 | 1.2 |
|  | Hop extract A[2] | 0.004 | 0.004 | 0.004 | 0.004 | 0.002 |
|  | Hop extract B[3] |  |  |  |  | 0.0004 |
|  | (C) 10% gluconic acid | 7.29 | 1.78 | 0.29 | 0.29 | 0.39 |
|  | Ion-exchanged water | Balance | Balance | Balance | Balance | Balance |
|  | Carbonated water (GV 3.1 v/v) |  |  |  | Balance |  |
|  | Total | 100.00 | 100.00 | 100.00 | 100.00 | 100.00 |
| Calculation | (A) Non-polymer catechin (mass %) | 0.18 | 0.18 | 0.18 | 0.18 | 0.18 |
|  | (B1) α-acid + iso-α-acid (mass %) | 0.0000074 | 0.0000074 | 0.0000074 | 0.0000074 | 0.0001237 |
|  | (B2) β-acid (mass %) | 0.000236 | 0.000236 | 0.000236 | 0.000236 | 0.000118 |
|  | (B) α-acid + iso-α-acid + β-acid (mass %) | 0.0002434 | 0.0002434 | 0.0002434 | 0.0002434 | 0.0002417 |
|  | Mass ratio [(B2)/(B)] | 0.969 | 0.969 | 0.969 | 0.969 | 0.488 |
|  | Mass ratio [(B)/(A)] | 0.00135 | 0.00135 | 0.00135 | 0.00135 | 0.00134 |
|  | Mass ratio [(B2)/(A)] | 0.00131 | 0.00131 | 0.00131 | 0.00131 | 0.00066 |
| Analysis | pH | 2 | 3 | 3.5 | 3.5 | 3.5 |
|  | GV (v/v) |  |  |  | 2.5 |  |
| Evaluation | Change in astringency | 3 | 4 | 4.5 | 5 | 4 |

|  |  | Example 6 | Example 7 | Example 8 | Example 9 | Example 10 |
|---|---|---|---|---|---|---|
| Formulation | Purified green tea extract[1] | 1.2 | 1.2 | 1.2 | 1.2 | 1.2 |
|  | Hop extract A[2] | 0.001 | 0.00016 | 0.00005 | 0.001 | 0.016 |
|  | Hop extract B[3] | 0.0006 | 0.00078 | 0.000079 |  |  |
|  | (C) 10% gluconic acid | 0.40 | 0.40 | 0.42 | 0.40 | 0.42 |
|  | Ion-exchanged water | Balance | Balance | Balance | Balance | Balance |
|  | Carbonated water (GV 3.1 v/v) |  |  |  |  |  |
|  | Total | 100.00 | 100.00 | 100.00 | 100.00 | 100.00 |
| Calculation | (A) Non-polymer catechin (mass %) | 0.18 | 0.18 | 0.18 | 0.18 | 0.18 |
|  | (B1) α-acid + iso-α-acid (mass %) | 0.0001819 | 0.0002343 | 0.0002371 | 0.0000019 | 0.0000298 |
|  | (B2) β-acid (mass %) | 0.000059 | 0.000009 | 0.000003 | 0.000059 | 0.000944 |
|  | (B) α-acid + iso-α-acid + β-acid (mass %) | 0.0002409 | 0.0002437 | 0.0002400 | 0.0000609 | 0.4009738 |
|  | Mass ratio [(B2)/(B)] | 0.245 | 0.039 | 0.012 | 0.969 | 0.969 |
|  | Mass ratio [(B)/(A)] | 0.00134 | 0.00135 | 0.00133 | 0.00034 | 0.00541 |
|  | Mass ratio [(B2)/(A)] | 0.00033 | 0.00005 | 0.00002 | 0.00033 | 0.00524 |
| Analysis | pH | 3.5 | 3.5 | 3.5 | 3.5 | 3.5 |
|  | GV (v/v) |  |  |  |  |  |
| Evaluation | Change in astringency | 3 | 2.5 | 2 | 4 | 4 |

|  |  | Example 11 | Example 12 | Example 13 | Comparative Example 1 | Comparative Example 2 |
|---|---|---|---|---|---|---|
| Formulation | Purified green tea extract[1] | 0.6 | 1.8 | 2.4 | 1.2 | 1.2 |

TABLE 1-continued

|  |  |  |  |  |  |  |
|---|---|---|---|---|---|---|
|  | Hop extract A[2] | 0.004 | 0.004 | 0.004 |  |  |
|  | Hop extract B[3] |  |  |  | 0.0008 |  |
|  | (C) 10% gluconic acid | 0.30 | 0.54 | 0.63 | 0.41 | 0.28 |
|  | Ion-exchanged water | Balance | Balance | Balance | Balance | Balance |
|  | Carbonated water (GV 3.1 v/v) |  |  |  |  |  |
|  | Total | 100.00 | 100.00 | 100.00 | 100.00 | 100.00 |
| Calculation | (A) Non-polymer catechin (mass %) | 0.09 | 0.27 | 0.36 | 0.18 | 0.18 |
|  | (B1) α-acid + iso-α-acid (mass %) | 0.0000074 | 0.0000074 | 0.0000074 | 0.0002400 | 0.0000000 |
|  | (B2) β-acid (mass %) | 0.000236 | 0.000236 | 0.000236 | 0.000000 | 0.000000 |
|  | (B) α-acid + iso-α-acid + β-acid (mass %) | 0.0002434 | 0.0002434 | 0.0002434 | 0.0002400 | 0.0000000 |
|  | Mass ratio [(B2)/(B)] | 0.969 | 0.969 | 0.969 | 0.000 | — |
|  | Mass ratio [(B)/(A)] | 0.00270 | 0.00090 | 0.00068 | 0.00133 | 0.00000 |
|  | Mass ratio [(B2)/(A)] | 0.00262 | 0.00087 | 0.00066 | 0.00000 | 0.00000 |
| Analysis | pH | 3.5 | 3.5 | 3.5 | 3.5 | 3.5 |
|  | GV (v/v) |  |  |  |  |  |
| Evaluation | Change in astringency | 3 | 3 | 2.5 | 1 | 1 |

[1] The purified green tea extract obtained in Production Example 1
[2] Hoplex: manufactured by Mitsubishi-Kagaku Foods Corporation, α-acid + iso-α-acid: 0.186 mass%, β-acid: 5.9 mass %
[3] Iso-α-acid stock solution: manufactured by Intelligent Sensor Technology, Inc., α-acid + iso-α-acid: 30 mass %

TABLE 2

|  | Example 4 | Example 10 | Comparative Example 1 | Comparative Example 2 |
|---|---|---|---|---|
| Change in color (Δb) | 24.1 | 23.8 | 28.3 | 28.4 |

As is seen from Tables 1 and 2, when at least one selected from the group consisting of an α-acid and an iso-α-acid, and a β-acid are incorporated into a non-polymer catechin-containing beverage, and the mass ratio of the β-acid to the total amount of these compounds and the pH of the beverage are controlled within specific ranges, the strengthening of the astringency of the beverage at the time of its long-term storage can be suppressed, and the astringency at the time of the long-term storage can be reduced, and further, a change in color of the beverage at the time of the long-term storage can be effectively suppressed.

The invention claimed is:

1. A packaged beverage, comprising the following components:
    (A) 0.025 mass % to 0.5 mass % of a non-polymer catechin, based on a mass of the packaged beverage; and
    (B)
       (B1) an α-acid and an iso-α-acid, and
       (B2) a β-acid, wherein:
    a mass ratio of (B2) the β-acid to the component (B), [(B2)/(B)], is 0.1 or more; and
    the packaged beverage has a pH of from 2 to 5 and an ethanol content of less than 1 mass %, based on the mass of the packaged beverage.

2. The packaged beverage according to claim 1, wherein a mass ratio of the component (B) to the component (A), [(B)/(A)], is from 0.00001 to 1.

3. The packaged beverage according to claim 1, wherein a mass ratio of the component (B2) to the component (A), [(B2)/(A)], is from 0.000001 to 1.

4. The packaged beverage according to claim 1, wherein a content of the component (B) is from 0.000001 mass % to 0.002 mass %, based on the mass of the packaged beverage.

5. The packaged beverage according to claim 1, wherein a content of the component (B2) is from 0.000001 mass % to 0.002 mass %, based on the mass of the packaged beverage.

6. The packaged beverage according to claim 1, wherein a content of the component (B1) is from 0.0000001 mass % to 0.0005 mass %, based on the mass of the packaged beverage.

7. The packaged beverage according to claim 1, further comprising a carbon dioxide gas as a component (D).

8. The packaged beverage according to claim 1, wherein the packaged beverage is subjected to heat sterilization.

9. The packaged beverage according to claim 1, further comprising an acidulant as a component (C).

* * * * *